(12) United States Patent  
Johnson

(10) Patent No.: US 6,282,807 B1
(45) Date of Patent: Sep. 4, 2001

(54) ROLL VOLUME INDICATOR

(75) Inventor: Brian R. Johnson, Midland, MI (US)

(73) Assignee: Filcon, Farwell, MI (US)

( * ) Notice: Subject to any disclaimer, the term of this patent is extended or adjusted under 35 U.S.C. 154(b) by 0 days.

(21) Appl. No.: 09/276,579

(22) Filed: Mar. 25, 1999

(51) Int. Cl.[7] .................. B65H 61/00; G01B 3/00
(52) U.S. Cl. .................. 33/733; 33/732; 116/200
(58) Field of Search ................. 33/733, 732, 755, 33/1 V, 1 F, 679.1; 116/200, 201, 208, 278, DIG. 14

(56) References Cited

U.S. PATENT DOCUMENTS

| | | | |
|---|---|---|---|
| Re. 7,123 | * 5/1876 | Morgan | 33/733 |
| 610,339 | 9/1898 | Atherton . | |
| 789,112 | * 5/1905 | Bannet | 33/733 |
| 1,082,337 | * 12/1913 | Kallam | 33/733 |
| 1,084,412 | * 1/1914 | Dugan | 33/733 |
| 1,935,970 | 11/1933 | Wooster et al. . | |
| 2,077,242 | 4/1937 | Pierre . | |
| 2,215,052 | 9/1940 | Price et al. . | |
| 2,239,222 | * 4/1941 | Funke | 33/733 |
| 2,330,909 | * 10/1943 | Olson | 33/128 |
| 4,161,249 | 7/1979 | Dashow . | |
| 4,698,292 | * 10/1987 | Hilger et al. | 430/273.1 |
| 4,901,663 | 2/1990 | DeLuca . | |
| 5,365,874 | 11/1994 | Dorfman . | |
| 5,538,587 | * 7/1996 | Sakano et al. | 156/505 |
| 5,588,219 | * 12/1996 | Seabrooks | 33/733 |
| 5,816,165 | 10/1998 | Huston . | |

* cited by examiner

Primary Examiner—Diego Gutierrez
Assistant Examiner—Maria Fernandez
(74) Attorney, Agent, or Firm—David M. Thimmig; Mayer, Brown & Platt

(57) ABSTRACT

A rolled web in combination with a dispenser having gauge indicia, the rolled web having roll volume indicia to aid a consumer in determining the relative amount of the product remaining on the roll. The web having indicia in a diagonal pattern along its length such that the lateral position of the indicia on the web relative to the gauge indicia on the dispenser indicates the relative portion of web remaining on the roll. Also disclosed is a method of indicating the relative portion of web remaining on a rolled web product where the method includes the steps of applying indicia to the web in a diagonal pattern along the length of the web, winding the web into a roll, and inserting the roll into a dispenser having gauge indicia wherein the position of the indicia on the web relative to the gauge indicia indicates the relative portion of web remaining on the roll.

29 Claims, 4 Drawing Sheets

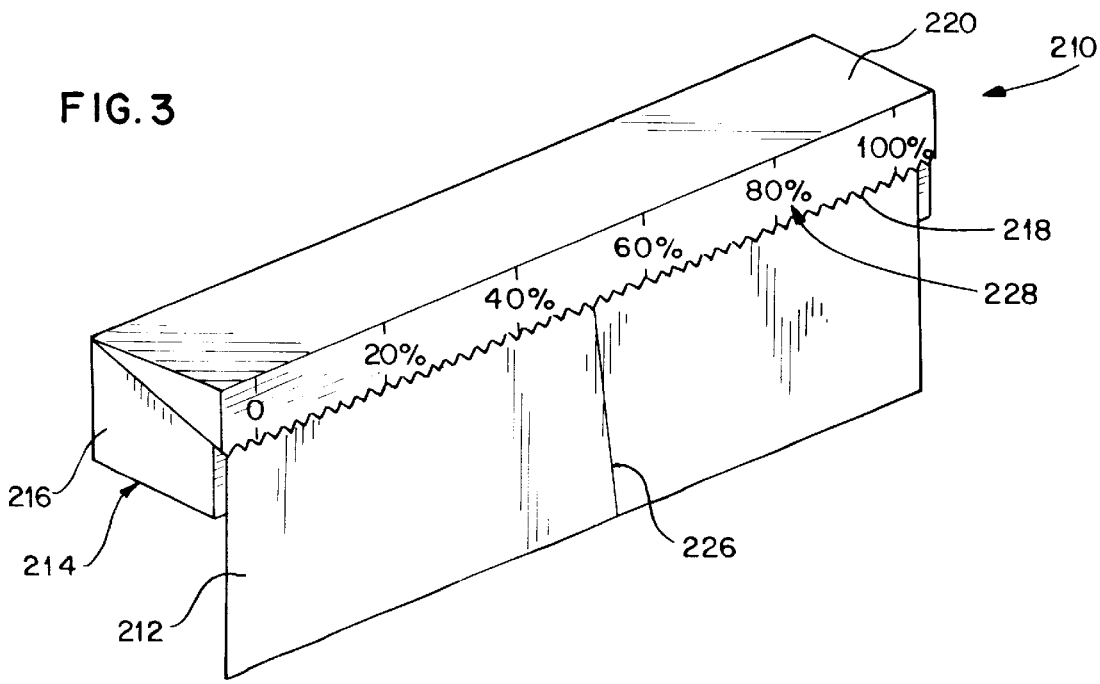
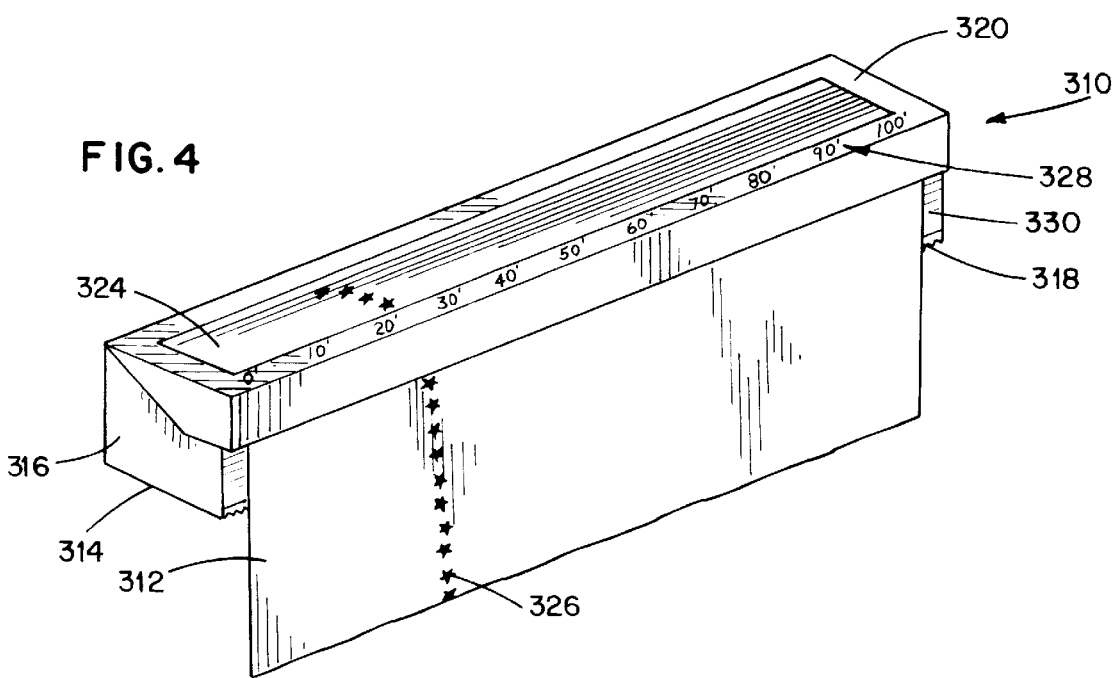

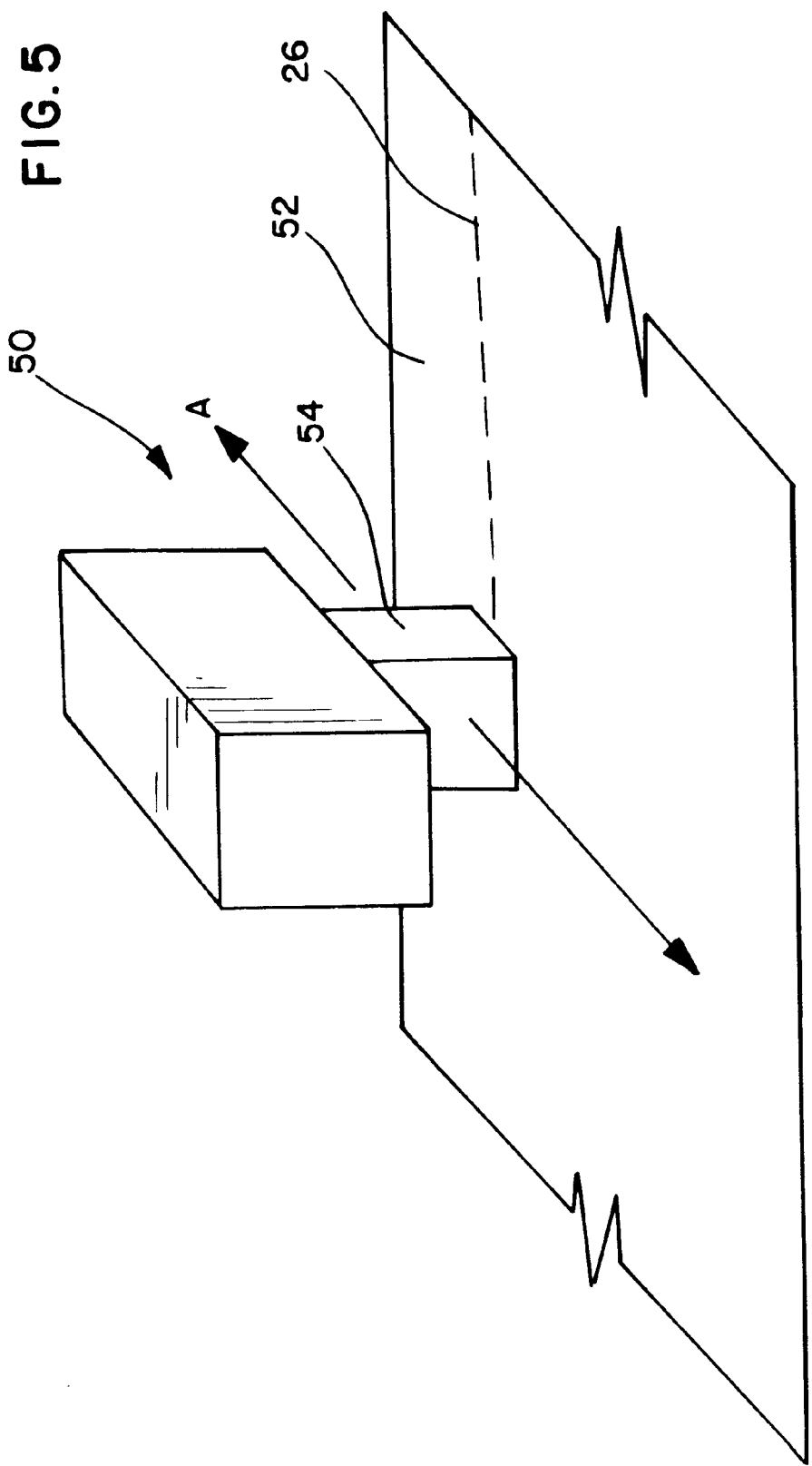

ROLL VOLUME INDICATOR

BACKGROUND OF THE INVENTION

1. Field of the Invention

The present invention generally relates to web products wound on rolls and more particularly to methods of indicating the relative volume of web remaining on consumer rolled web products. The consumer rolled web products of the present invention include indicia on the web arranged in a diagonal pattern along the length of the web and may include a dispensing container having corresponding gauge indicia whereby the position of the indicia on the web relative to the gauge indicia on the dispenser provides an indication of the amount of the web remaining on the roll.

2. Discussion of the Prior Art

Manufacturers have developed several indicating means for use with wound web products, but they are most often suited to commercial applications or intended for use by maintenance personnel on a frequent and routine basis. Some methods involve treating finished rolls to create a series of markings that would be machine readable or visible along one edge of the web and whose relative spacing apart would change as the roll is unwound. Many of these methods tend to require additional handling and processing of previously wound rolls to create the markings. Others may involve placing something, such as a marking strip or insert at some point within the roll to indicate that the roll is nearing depletion. Some commercial products may attach markings to the web that are intended to indicate when a continuous reusable product must be serviced. Moreover, the indicia used on commercial rolled web products often is applied in an invasive or destructive manner, and in a format that would not be conveniently interpreted by a common consumer using the product on an infrequent basis.

In contrast to web products intended for commercial use, for regular monitoring by an attendant, or for reuse in a commercial setting, web products also are commonly provided in roll form for a variety of consumer uses. Consumers are readily familiar with many rolled web products such as various types of foil, plastic film, paper and coated paper. Such web products may be supplied in single or multi-ply sheet configuration, or in alternative forms such as bags or the like. These consumer rolled web products may be coreless, or wound on a hollow or solid core. The consumer products may be used with food or other perishable items, and are less likely to be used on a frequent and routine basis.

Consumer rolled products are typically dispensed from a container, which may be provided with a serrated cutting edge. Alternatively, perforations may be provided laterally across the web. In either form, consumer rolled products are understood to permit a user to dispense and separate for use as much of the web as needed and available at any given time. They are also understood to be consumable, in the sense that the used portion of the web is not intended to be returned to a roll for repeated use.

In light of shortcomings of roll volume indicators in prior art wound web products, it is desirable to have indicia that is relatively simple to apply to a web while being readily understood by a common consumer. It is desirable that such indicia be provided for convenient viewing along the lateral span of the wound web product. It also is advantageous to have the dispensing container embody corresponding gauge indicia to help the consumer interpret the significance of the position of the relative lateral position of the indicia on the web. It further is desirable to have the indicia applied in a manner that permits viewing from either side of the web as it is unwound. It also is advantageous to have the indicia applied to the web in a noninvasive manner. The present invention overcomes the disadvantages of the prior art, while providing above-mentioned desirable features for roll volume indication on consumer rolled web products.

SUMMARY OF THE INVENTION

The purpose and advantages of the invention will be set forth in and apparent from the description and drawings that follow, as well as will be learned by practice of the invention disclosed and claimed herein.

The present invention is generally embodied in a rolled web having roll volume indicia to aid a consumer in determining the relative amount of the product remaining on the roll. The rolled web comprises a length of web having at least one surface and the indicia applied to the surface in a diagonal pattern along the length of the web whereby when unwinding the web from the roll, the lateral position of the indicia on the web indicates the relative portion of web remaining on the roll.

In a further aspect of the invention, a method of applying roll volume indicia to a web is provided comprising the steps of providing a length of web to be marked with the indicia, applying indicia to the web in a diagonal pattern along the length of the web, and forming a roll of web from the marked length of web.

In another aspect of the invention, a rolled web product has in combination a roll dispenser having an opening and a length of web wound into a roll. The web has roll indicia in a diagonal pattern along its length while the dispenser has gauge indicia on a surface adjacent the opening. The relative length of web remaining on the roll is indicated by the position of the roll indicia on the web relative to the gauge indicia on the dispenser.

In yet another aspect of the invention, a method of indicating the relative length of web remaining on a rolled web product is provided comprising the steps of applying indicia to the web in a diagonal pattern along the length of the web, winding the web into a roll, and inserting the roll into a dispenser having gauge indicia wherein the position of the indicia on the web relative to the gauge indicia indicates the relative length of web remaining on the roll.

BRIEF DESCRIPTION OF THE DRAWINGS

In describing the preferred embodiment, reference is made to the accompanying drawings wherein like parts have like reference numerals, and wherein:

FIG. 3 is a perspective view of an opaque rolled web product having printed roll indicia, in a dispenser bearing alternative gauge indicia.

FIG. 4 is a perspective view of an opaque rolled web product having printed roll indicia, in a dispenser having a viewing window and alternative gauge indicia.

FIG. 5 is a perspective schematic view of a method of applying indicia to a web during the process of forming a consumer roll.

It should be understood that the drawings are not to scale. While other plan and section views of the preferred embodiments, as well as considerable mechanical details of a device for applying indicia to a roll have been omitted, such details are not considered necessary for one skilled in the art to obtain a full and complete understanding of the invention disclosed and claimed herein. It should also be understood that the present invention is not limited to the preferred embodiments illustrated.

DETAILED DESCRIPTION OF THE PREFERRED EMBODIMENTS

Figure 1:
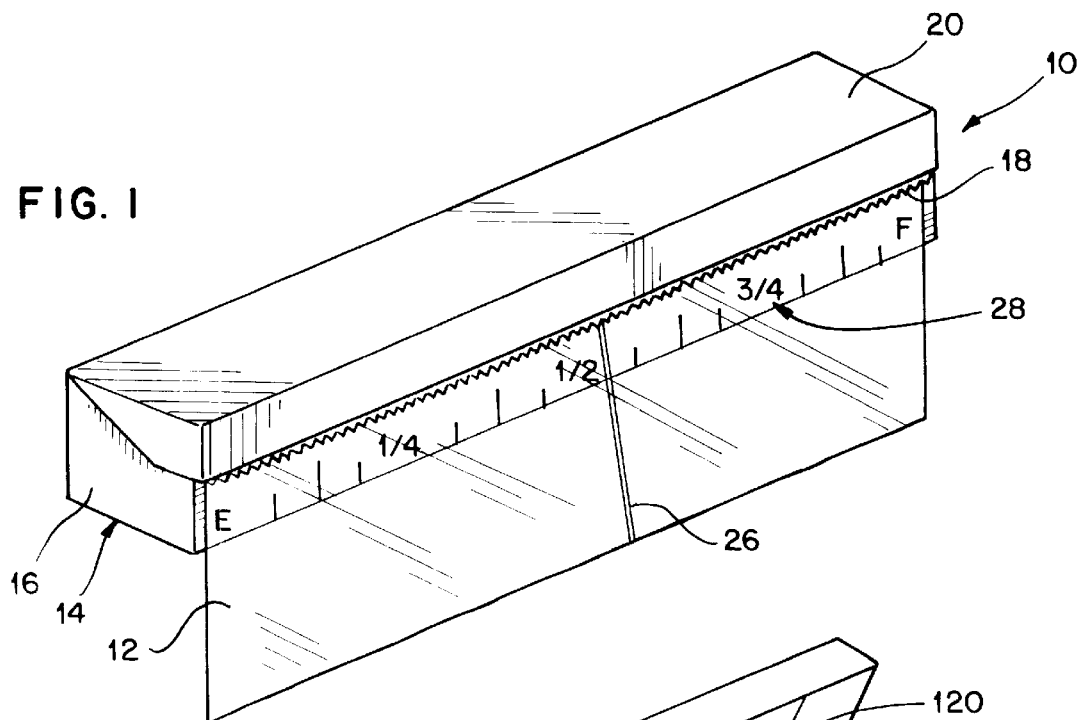
FIG. 1 is a perspective view of a transparent rolled web product having continuous embossed roll indicia, in a dispenser bearing gauge indicia.

Referring now to FIG. 1, the present invention is generally embodied in a rolled web product 10 that includes a rolled web 12 and a dispenser 14. The rolled web 12 may be formed of any of a variety of metal foil, plastic film, paper, coated paper, woven and non-woven web materials. The web also may be of single or multi-ply sheet configuration, or may be constructed for other purposes, such as in the form of bags or the like. As commonly understood and not shown, the web 12 may be wound on itself without a core, or may be wound on a hollow core such as a tube of plastic or cardboard (understood to be constructed of corrugated, chipboard, pressed fiber or the like), or on a solid core such as a plastic, cardboard or wooden mandrel.

Figure 2:
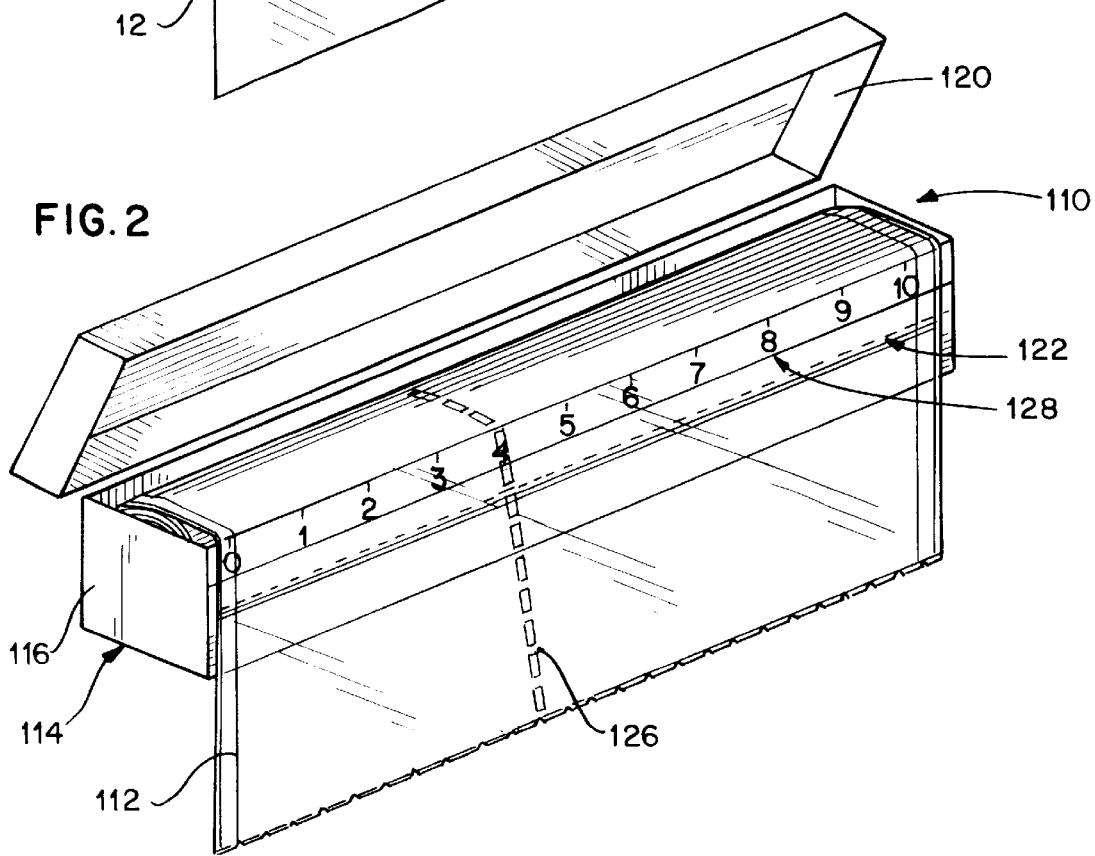
FIG. 2 is a perspective view of a transparent rolled web product having intermittent embossed roll indicia, in a dispenser having alternative gauge indicia.

The dispenser 14 also may be of a variety of constructions. As an example of a dispenser construction, FIG. 1 shows a cardboard box 16 with a metal serrated edge 18 affixed to the lower edge of a trunk lid 20. In an alternative embodiment, the web 112 in FIG. 2 is a series of bags which contains lines of perforations 122 to permit tearing without need for a serrated edge on dispenser 114. FIG. 2 shows a fully separable lid 120. In a further example, FIG. 3 shows an alternative dispenser 214, constructed of a molded plastic box 216 which may be reusable and which has an integral serrated edge 218 formed at the lower edge of the trunk lid 220. FIG. 4 shows a dispenser 314 of similar construction to that shown in FIG. 1, but having a window 324 in the lid 320 to permit the user to quickly and conveniently view the rolled web without lifting the lid, and a metal serrated edge 318 at the bottom of a front panel 330. It will be appreciated that dispensers also may be provided with different lid configurations, such as those shown or others known in the art. Similarly, if the dispenser is provided with a serrated edge, it may be located along a container edge other than as shown on the lid or at the bottom of the front wall of the container. Also as known in the art, the dispenser may include an inserted panel with a serrated bar attached to one side (not shown). In addition, the viewing window of FIG. 4 could be simply an opening in the dispenser or could include a transparent film or the like as is known in the industry for packaging of dry goods. The window could be located on any of the lateral surfaces of the dispenser to provide a view of the roll contained therein.

Figure 6:
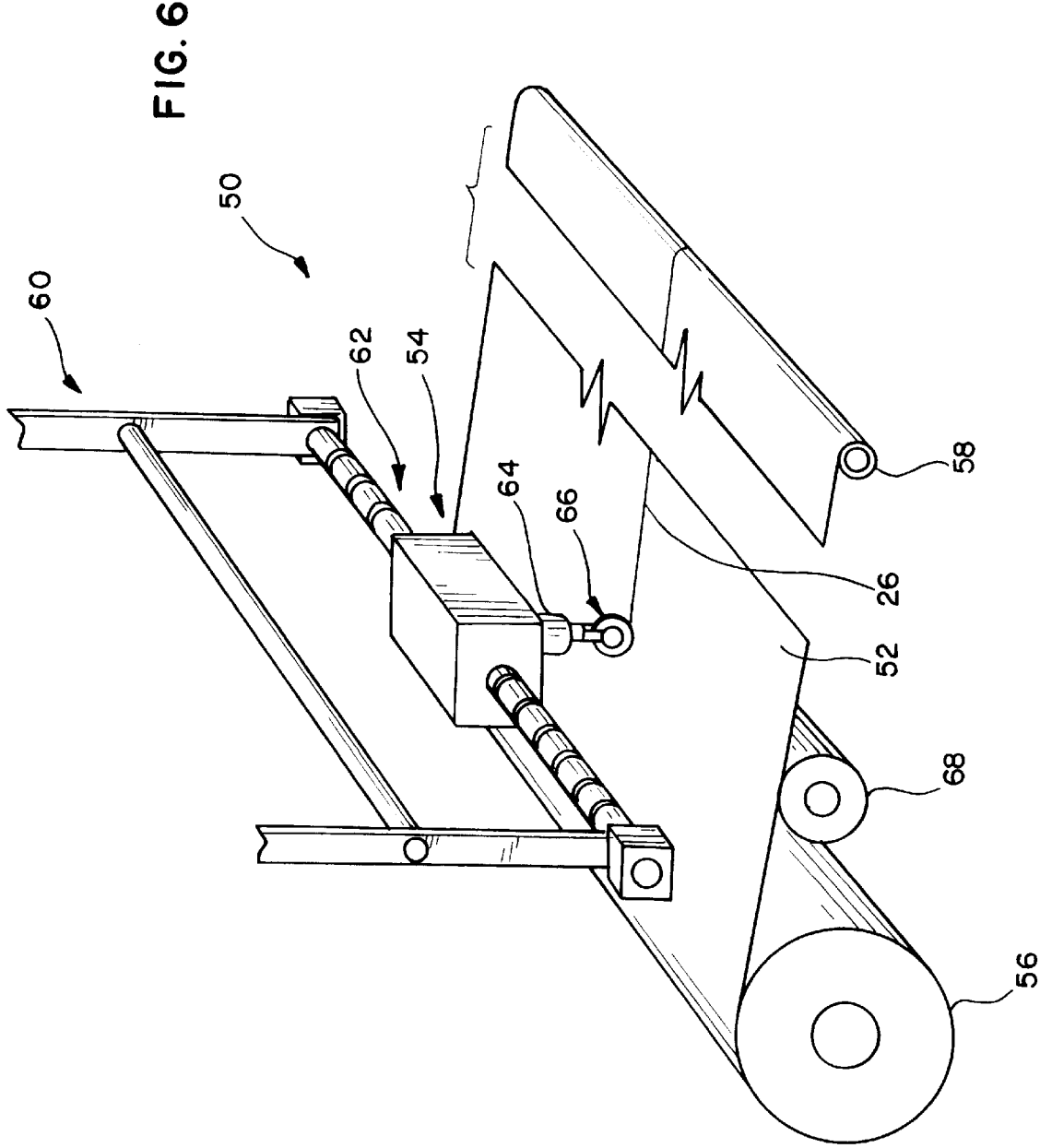
FIG. 6 is a perspective schematic view of a method of applying indicia to a web by embossing the web during the process of forming a consumer roll.

The rolled webs of all of the embodiments have a top and bottom outer surface and are conventionally produced by winding the web product into a roll. As an example of such a process, FIG. 6 shows a converting process that converts large industrial roll stock of web into a multitude of consumer-sized finished rolled webs. In the present invention, as seen in the example of FIG. 6, roll indicia 26 is applied to the web during the web winding process. One skilled in the art will appreciate the advantage of applying the indicia during the normal winding process of the various types of webs and that the indicia may be applied in many ways to provide a diagonal pattern visible on at least one of the outer surfaces of the web. It will also be appreciated that reference herein to applying indicia to or on a web may include processes which do not include depositing foreign matter on the web, such as in embossing where no other material is added or attached to the web.

Among the variety of ways of applying roll indicia, the embodiments illustrated in FIGS. 1, 2 and 6 provide examples of indicia applied by embossing. FIG. 1 shows a roll where the embossment 26 is applied as a continuous diagonal line along the entire length of a transparent rolled web 12. The line begins in one corner at a first end of the web and translates laterally across the web as the web advances to end in the opposite corner at the second end of the web. The embossment will appear to move laterally across the web 12 as the web is dispensed. FIG. 2 shows a transparent rolled web 112 of bags with embossed indicia 126, however, the embossed indicia is applied in an intermittent pattern. Various embossing methods, such as pinwheel, scribe and rotary may be used, and the embossing tool may range from blunt to sharp, with the understanding that it would not typically be desirable to perforate the web during embossing. Alternatively, it will be appreciated that laser markings or etchings may be applied to webs using known techniques. One skilled in the art will appreciate that many methods of embossing or laser marking may be used and that, depending on the web material involved, some methods may be more appropriate than others.

Regardless of which method is used, embossing or laser marking the web are the preferred methods of applying roll indicia 26 because of their numerous advantages. For instance, they can be done in-line with the roll winding process, eliminating the need for additional handling and processing to mark finished rolls. Embossing and laser marking are essentially nondestructive and noninvasive to the material of the web when considering the use for which the webs are intended. Roll indicia applied by these methods avoids potential sanitary problems encountered with applying foreign matter to the rolled web product. Whether continuous or intermittent, the indicia may embody a fanciful design, such as an identifier associated with the name brand of the product. Moreover, depending on the web product and method used, an embossment or laser marking may be visible on both of the outer surfaces of the web.

For at least the above-mentioned reasons, embossing or laser marking are the preferred methods of applying indicia to rolled webs. However, manufacturers may choose to apply roll indicia using various printing methods, such as applying an ink by spray or wet roller applicator. Depending on the material of the web and its intended use, printing the indicia may achieve many of the same benefits. FIG. 3 shows an example of an opaque rolled web 212 where the indicia is applied as a solid printed line 226 to one of the two outer surfaces of the web. As a further example, FIG. 4 shows an opaque web 312 where fanciful indicia is applied intermittently in a pattern that also stretches diagonally across the web. One skilled in the art will appreciate that if the web will be in contact with food or perishable items and ink is chosen as the indicia, then the ink chosen should be food-grade acceptable.

As seen in FIG. 1, the dispenser 14 may bear gauge indicia 28 applied by one of many conventional means, such as by direct printing or by printed label. With the transparent web of FIG. 1, the gauge indicia 28 may be applied in several locations on dispenser 14, one example of which is to the lower front portion of box 16. As an alternative, the transparent web of bags in FIG. 2 is shown with gauge indicia 128 on the upper front portion of box 116, so as to be hidden by the trunk lid 120 when the box 116 is closed.

With opaque or transparent webs, gauge indicia 228 also can be applied to many different locations of a plastic dispenser, most conveniently to the front of a lid as is shown in FIG. 3. The gauge indicia 228 may be integrally formed into the dispenser, or may be applied such as by direct printing or printed label. Also, in the embodiment of FIG. 4, regardless of web transparency, the gauge indicia 328 may be applied in several locations typically adjacent the window 324, such as shown on lid 320 to permit immediate and convenient correspondence with the roll indicia 326.

It will be appreciate that the gauge indicia may reflect the portion of the rolled web remaining in various ways. The preferred embodiments show several examples, such as the fraction of the roll seen in FIG. 1, the quantity of pieces or bags seen in FIG. 2, the percentage of the roll seen in FIG. 3, or the length of the roll remaining seen in FIG. 4. Absent gauge indicia on the dispenser, the position of the roll indicia 26 on the rolled web 12 relative to the length of the dispenser 14 may be used to provide a rough estimate of the relative portion of the web remaining on the roll.

Now turning to FIG. 5, a schematic of a roll indicia applicator is shown. The applicator 50 is arranged to be used in-line, to apply indicia 26 to the web 52 as the web passes by the applicator. The applicator 50 may be arranged to be above or below the web 52 and, as is shown in FIG. 6, may include componentry both above and below the web. In any event, the applicator 50 will have a working head 54 adapted to utilize one or more of the accepted methods of marking the web with indicia, such as embossing, laser marking or printing. The working head 54 is controlled to cycle, laterally traversing the web 52 along axis A as the web advances, so as to apply the indicia 26 in a diagonal pattern to the web 52 which is formed into rolls.

An example of a roll indicia applicator 50 which features a method of embossing is shown in the schematic diagram of FIG. 6. In this example, the applicator 50 is arranged to be used in-line, to apply indicia 26 to the web 52 during the process of converting from the large industrial roll stock 56 to the finished roll 58. As shown, the applicator 50 may utilize an overhead tool bar 60 with an actuator 62, such as of the servo controlled ball and screw type, to move a working head 54 transversely with respect to the web 52. In this example, the working head 54 includes an air cylinder 64 to control the vertical position of a marking tool 66. The air cylinder 64 can be arranged for selective pressure control with respect to the type of web material being embossed. The air cylinder 64 also may be retracted, to permit the working head 54 to position the marking tool 66 at any position across the web 52, such as adjacent one edge.

The marking tool 66 comprises a roller that may be separately driven, or may be simply a free-wheeling roller driven by the movement of the web 52, as shown in FIG. 6. The marking tool 66 is positioned directly above the web 52 and preferably as close to the finished roll 58 as possible. An applicator idler roller 68 is positioned opposite the marking tool 66 to support the web and may similarly be driven by the movement of the web 52 passing over it or may be mechanically driven at an appropriate surface speed. The air cylinder 64 may be extended to force the marking tool 66 to engage the web 52 to begin embossing. Once embossing of a length of web for a given roll is completed, the air cylinder 64 may be retracted to disengage the roller from the web. The marking tool 66 may then be moved transversely to return to an initial position relative to an edge of the web 52 for processing the next length of web. The air cylinder 64 may then be extended to repeat the cycle for embossing the next length of web 52. With other forms of roll indicia applicators, such as those which may use laser marking, it may be possible to position the working head at a single height, spaced appropriately from the surface of the web, engaging a marking tool to apply the indicia as the working head traverses the moving web and then disengaging the marking tool while the working head returns to its original position for the next length of web.

FIG. 6 provides a schematic diagram of but one example of the many structures and methods available to apply indicia to a rolled web consistent with the present invention. FIG. 6 does not include depictions of additional mechanical details, such as the web separation means that would be employed between the indicia applicator 50 and the finished roll 58, or the fixturing, drive means, hoses, electrical wiring or other specific components, as such arrangements and details are believed to be readily developed for the particular user's purposes by those skilled in the art. It should be understood that any of a variety of suitable materials of construction and dimensions for the indicia applicator may be used to satisfy the particular needs and requirements of the end user. One skilled in the art will appreciate the many ways of utilizing embossing, laser or printing technologies to apply a continuous or intermittent diagonal pattern of indicia to a length of web. Although the positions of the beginning and end of the diagonal pattern of indicia may vary, it is preferred to have the indicia run the entirety of each web length to be formed into a roll and to have it run from adjacent one side edge of the web to adjacent the other side edge of the web.

It will be apparent to those skilled in the art that modifications and variations can be made in the design and construction of the web, roll volume indicia, dispenser, gauge indicia, roll volume indicia applicator, and method of applying the indicia without departing from the scope or spirit of the invention. Other embodiments of the invention will be apparent to those skilled in the art from consideration of the specification and practice of the invention disclosed herein.

What is claimed is:

1. A rolled web in combination with a dispenser having gauge indicia, the rolled web comprising a length of web having at least one surface and roll volume indicia applied to the surface in a diagonal pattern along the length of the web wherein the lateral position of the indicia on the web relative to the gauge indicia on the dispenser indicates the relative portion of rolled web remaining.

2. The rolled web and dispenser of claim 1 wherein the roll volume indicia further comprises a continuous pattern.

3. The rolled web and dispenser of claim 1 wherein the roll volume indicia further comprises an intermittent pattern.

4. The rolled web and dispenser and indicia of claim 1 wherein the roll volume indicia further comprises embossing on the web.

5. The rolled web and dispenser and indicia of claim 1 wherein the roll volume indicia further comprises at least one laser marking on the web.

6. The rolled web and dispenser of claim 1 wherein the roll volume indicia further comprises printing on the web.

7. A rolled web product comprising in combination a roll dispenser having an opening and a length of web wound into a roll, the web having roll indicia in a diagonal pattern along its length, the dispenser having gauge indicia on a surface adjacent the opening, whereby the relative length of web remaining on the roll is indicated by the position of the roll indicia on the web relative to the gauge indicia on the dispenser.

8. The rolled web product of claim 7 wherein the roll indicia further comprises a continuous pattern.

9. The rolled web product of claim 7 wherein the roll indicia further comprises an intermittent pattern.

10. The rolled web product of claim 7 wherein the roll indicia further comprises embossing on the web.

11. The rolled web product of claim 7 wherein the roll indicia further comprises at least one laser marking on the web.

12. The rolled web product of claim 7 wherein the roll indicia further comprises printing on the web.

13. The rolled web product of claim 7 wherein the dispenser comprises a container having a lid.

14. The rolled web product of claim 13 wherein the lid comprises a trunk lid.

15. The rolled web product of claim 13 wherein the adjacent surface is a surface on the lid.

16. The rolled web product of claim 13 wherein the opening is in a surface of the lid.

17. The rolled web product of claim 13 wherein the lid has a closed position and the dispenser further comprises an opening through which the roll having roll indicia may be viewed while the dispenser lid is in the closed position.

18. The rolled web product of claim 7 wherein the dispenser has a front wall and the adjacent surface is a surface on the front wall.

19. The rolled web product of claim 7 wherein the dispenser is made at least in part of cardboard.

20. The rolled web product of claim 19 wherein the dispenser further comprises a serrated blade.

21. The rolled web product of claim 7 wherein the dispenser is made at least in part of plastic.

22. The rolled web product of claim 21 wherein the plastic dispenser further comprises an integral serrated blade.

23. The rolled web product of claim 21 wherein the plastic dispenser further comprises an integral trunk lid.

24. A method of indicating the relative length of web remaining on a rolled web product, the method comprising the steps of:
    (a) applying indicia to the web in a diagonal pattern along the length of the web;
    (b) winding the web into a roll;
    (c) inserting the roll into a dispenser having gauge indicia wherein the position of the indicia on the web relative to the gauge indicia indicates the relative length of web remaining on the roll.

25. The method of claim 24, wherein the indicia on the web is applied in a continuous pattern along the length of web.

26. The method of claim 24, wherein the indicia is on the web is applied in an intermittent pattern along the length of web.

27. The method of claim 24, further comprising the steps of advancing the web along an embossing path, engaging the web with an embosser, and moving the embosser laterally relative to the web as the web advances.

28. The method of claim 24, further comprising the steps of advancing the web along a laser marking path, energizing a laser, applying laser markings to the web, and moving the laser laterally relative to the web as the web advances.

29. The method of claim 24, further comprising the steps of advancing the web along a print path, engaging a printer, applying print markings to the web, and moving the printer laterally relative to the web as the web advances.

* * * * *